(12) United States Patent
Deutschmann et al.

(10) Patent No.: US 11,613,176 B2
(45) Date of Patent: Mar. 28, 2023

(54) FUEL FILLER CAP

(71) Applicant: MAGNA Energy Storage Systems GmbH, Grevenbroich (DE)

(72) Inventors: Philipp Deutschmann, Schwalmtal (DE); Ralf Malskorn, Neuss (DE)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 0 days.

(21) Appl. No.: 17/549,406

(22) Filed: Dec. 13, 2021

(65) Prior Publication Data

US 2022/0227222 A1 Jul. 21, 2022

(30) Foreign Application Priority Data

Jan. 19, 2021 (EP) ...................................... 21152313

(51) Int. Cl.
B60K 15/04 (2006.01)

(52) U.S. Cl.
CPC ...................... B60K 15/0406 (2013.01); *B60K 2015/0451* (2013.01)

(58) Field of Classification Search
CPC .................. B60K 15/0406; B60K 2015/0451
USPC .......................................................... 220/295
See application file for complete search history.

(56) References Cited

U.S. PATENT DOCUMENTS

| | | | |
|---|---|---|---|
| 3,980,111 A * | 9/1976 | Badger | B64D 37/14 285/12 |
| 4,436,219 A | 3/1984 | Reutter | |
| 6,209,745 B1 * | 4/2001 | Jansson | B62J 35/00 220/DIG. 34 |
| 2011/0003124 A1 | 2/2011 | Hanussek et al. | |

FOREIGN PATENT DOCUMENTS

| | | | | |
|---|---|---|---|---|
| DE | 3601668 A1 | * | 7/1987 | |
| DE | 102004048303 A1 | | 5/2005 | |
| DE | 102010032527 A1 | | 2/2011 | |
| DE | 102010018126 A1 | * | 11/2011 | ........... B60K 15/035 |
| EP | 0080624 A1 | | 6/1983 | |
| EP | 1574448 A1 | * | 9/2005 | ......... B60K 15/0406 |
| EP | 3594040 A1 | | 1/2020 | |

OTHER PUBLICATIONS

DE 3601668 A1 (Konrad) (Jul. 23, 1987) (machine traslation) (Year: 1987).*
European Search Report for EPO Patent Application No. 21152313. 9, dated Sep. 6, 2021, 4 pages.

* cited by examiner

*Primary Examiner* — Mahmoud Gimie
(74) *Attorney, Agent, or Firm* — Jordan IP Law, LLC; Todd A. Vaughn

(57) ABSTRACT

A tank closure that includes a first tank closure member, a second tank closure member, and a bias member having a spring force to brace the second tank closure against the first tank closure member. The first tank closure member has a first stop member, while the second tank closure member has a second stop member. The second tank closure member is flexibly mounted in an axial direction relative to the first tank closure member, the second tank closure member. The second stop member, in a closed position of the tank closure, forms a mechanical stop relative to the first stop member to prevent axial movement of the second tank closure member relative to the first tank closure member against the spring force of the bias member.

19 Claims, 4 Drawing Sheets

FUEL FILLER CAP

CROSS-REFERENCE TO RELATED APPLICATIONS

The present application claims priority under 35 U.S.C. § 119 to European Patent Publication No. EP 21152313.9 (filed on Jan. 19, 2021), which is hereby incorporated by reference in its complete entirety.

TECHNICAL FIELD

Embodiments relate to a tank closure, in particular, a tank closure for a motor vehicle tank.

BACKGROUND

Tank closures are generally used in order to be able to close, outside refuelling times, a tank filler neck of a tank which is open for refuelling. Various locking mechanisms for tank closures are already known. In particular, mechanisms which brace a tank closure member in an unscrewed state against a further tank closure member via a spring are already used. In such a mechanism, a defined ramp/slope such as in the case of bayonet or screw closures is not required. The advantage of this technique is that an external seal of the tank closure is always pressed with the same degree of strength onto the tank filler neck irrespective of its temperature, stiffness and signs of wear and tear.

The behaviour of such tank closures with spring tensioning, however, is disadvantageous in the case of an overpressure in the tank: the axially movable tank closure member is thus not secured against being lifted off the tank filler neck in the case of an overpressure in the tank, as is the case when using a bayonet or screw member. From the point where the tank internal pressure is greater than the spring force, the axially movable tank closure member is forced out of its position and loses the sealing action. This mechanism is thus not suitable for greater pressures in tank applications and, in particular, is not suitable for pressurized tank applications, since the movable tank closure member is also forcibly opened via the mechanism in the case of overpressure.

SUMMARY

One or more embodiments relate to a tank closure in which an axially movable (second) tank closure member, in particular, with a seal on the axially movable tank closure member, is pressed with a uniform force onto a further non-axially movable (first) tank closure member, wherein the tank closure is also intended to be suitable for greater pressures and, in particular, for pressurized tank applications.

In accordance with one or more embodiments, a tank closure comprises a first tank closure member and a second tank closure member that is flexibly mounted in an axial direction relative to the first tank closure member and is braced against the first tank closure member via a bias member (e.g., spring). The first tank closure member has a first stop member and the second tank closure member has a second stop member such that in a closed position of the tank closure, the second stop member forms a mechanical stop relative to the first stop member in a manner that prevents axial movement of the second tank closure member relative to the first tank closure member against the spring force of the bias member.

In accordance with one or more embodiments, a tank closure uses a bias member such as a spring in order to pretension a second tank closure member relative to a first tank closure member. The second tank closure member, in particular, a seal of the second tank closure member, in the closed position of the tank closure is pushed with uniform force against the first tank closure member by the spring force. In a case of high pressure, in order to prevent the second tank closure member from being lifted off in the tank interior, a stop is designed between the second tank closure member and the first tank closure member. In the closed position the stop mechanically prevents the second tank closure member from being lifted off. To this end, the first tank closure member has a first stop member and the second tank closure member has a second stop member such that in the closed position the second stop member comes into abutment/contact against the first stop member, and as a result, the second tank closure member is prevented from being axially lifted off the first tank closure member against the spring force.

Thus, in accordance with one or more embodiments, in a mechanism with spring pretensioning of an axially movable second tank closure member, an additional mechanical locking via a stop is used. The locking is preferably only effective when the closure is screwed onto the first tank closure member as far as an end position. In accordance with one or more embodiments, a member is used which blocks the spring mechanism in the closed state. As a result, in the case of rising tank internal pressure the second tank closure member is no longer able to be pushed out of the sealing position.

Embodiments solve the problem that in the case of high tank internal pressures the second tank closure member becomes untight, or has a pressure relief valve, even in cases where a pressure relief valve is not desired. Moreover, the crash behaviour of the tank closure is improved by this solution since in the case of a crash the closure may be lifted off the closure base by compressed stop parts, in particular metal parts.

In accordance with one or more embodiments, the second tank closure member and the first tank closure member are configured such that the second tank closure member is able to be brought into the closed position by rotation relative to the first tank closure member as far as the end position, wherein before the end position, and thus, outside the closed position, the second stop member does not come into abutment against the first stop member.

In accordance with one or more embodiments, in the closed position, a seal of the second tank closure member, in particular, an external seal, is axially pressed by the spring toward the first tank closure member.

In accordance with one or more embodiments, the second stop member is formed by at least one locking bar and the first stop member is formed by at least one bearing surface, i.e., stop surface, for the locking bar.

In accordance with one or more embodiments, the first tank closure member preferably comprises a rotatable tank closure component, which is rotatable with the second tank closure member, and a non-rotatable tank closure component, which remains stationary during the rotation of the second tank closure member, is thus not rotated.

In accordance with one or more embodiments, the non-rotatable tank closure component is preferably configured for attachment to a tank filler neck such that the position of the non-rotatable tank closure component is secured in the peripheral direction by the tank filler neck. To this end, the non-rotatable tank closure component particularly preferably has a non-rotationally symmetrical shaped portion which may engage in a corresponding non-rotationally symmetrical mating shaped portion of the tank filler neck, i.e., it may form a non-rotationally symmetrical positive connection with a tank filler neck.

In accordance with one or more embodiments, the bearing surface of the first stop member is preferably configured on the non-rotatable, stationary tank closure component.

In accordance with one or more embodiments, preferably, a ramp member is configured on the non-rotatable tank closure component, wherein in the closed position an extension of the rotatable tank closure component is located at a distal end of the ramp member in order to adopt the end position.

In accordance with one or more embodiments, the rotatable tank closure component is preferably entrained with the rotation of the second tank closure member via the locking bar of the second tank closure member, such that the rotatable tank closure component is rotated with the second tank closure member.

DRAWINGS

One or more embodiments will be illustrated by way of example in the drawings and explained in the description hereinbelow.

DESCRIPTION

Figure 1:
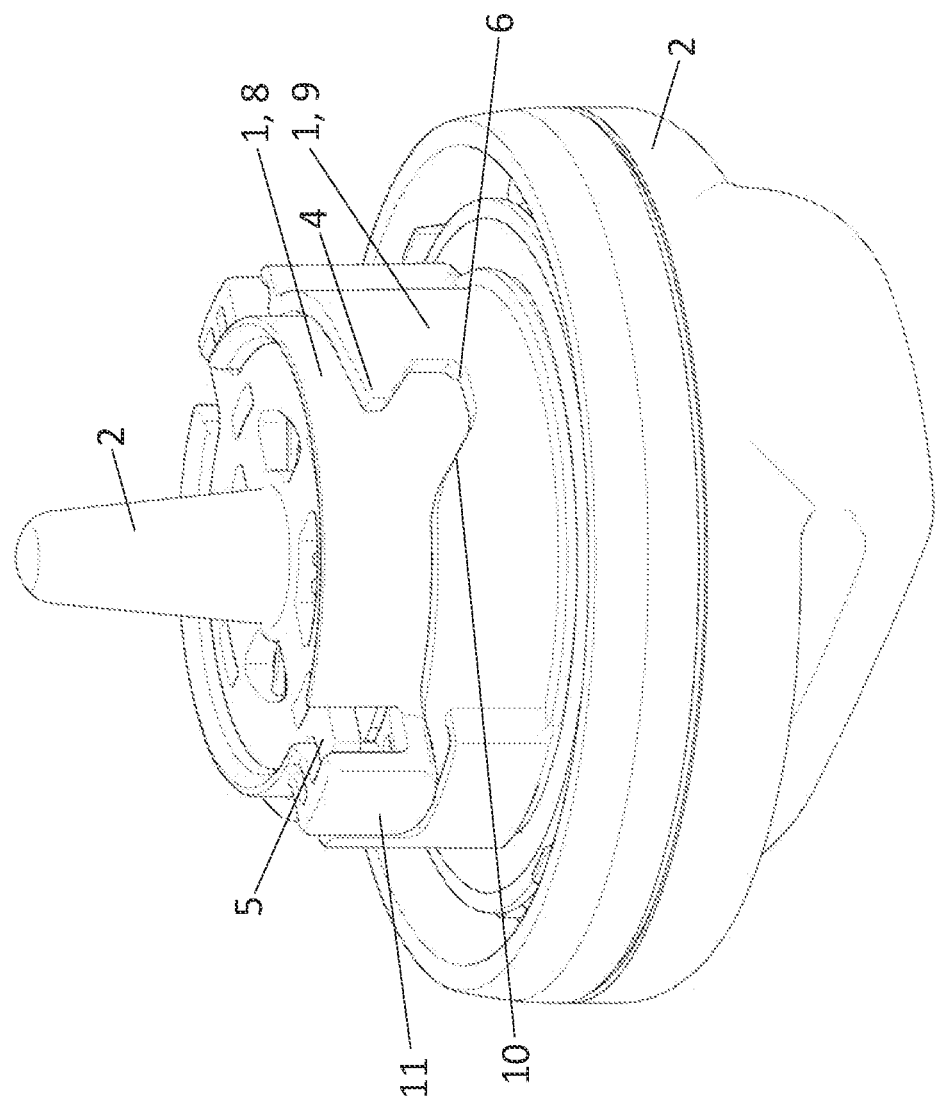
FIG. 1 illustrates a three-dimensional view of a tank closure in an open position, in accordance with one or more embodiments.
Figure 2:
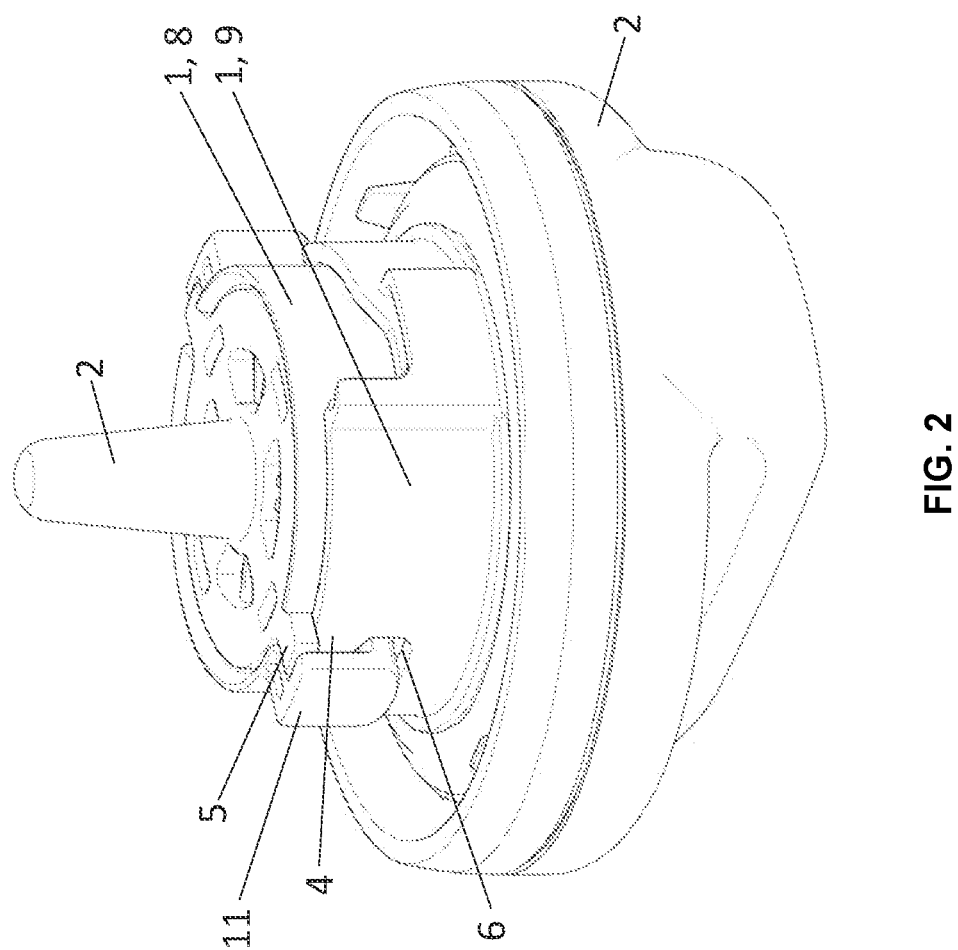
FIG. 2 illustrates a three-dimensional view of the tank closure of FIG. 1 in the closed position.
Figure 3:
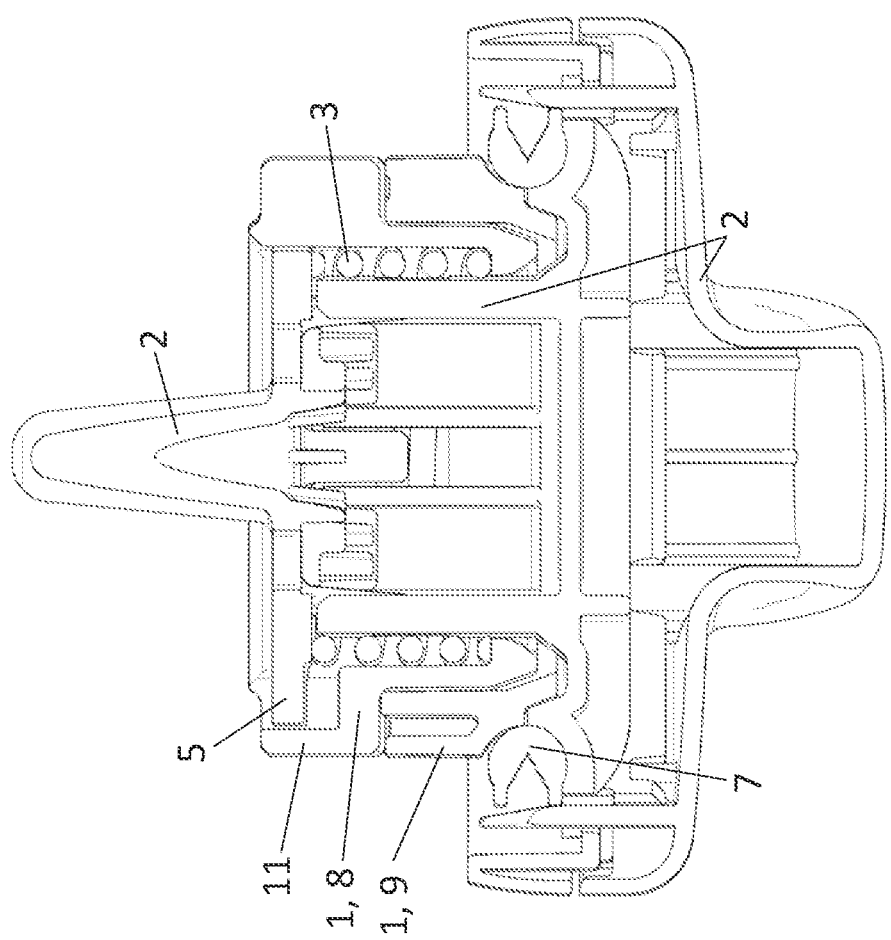
FIG. 3 illustrates a sectional view of the tank closure of FIG. 1 in the open position.
Figure 4:
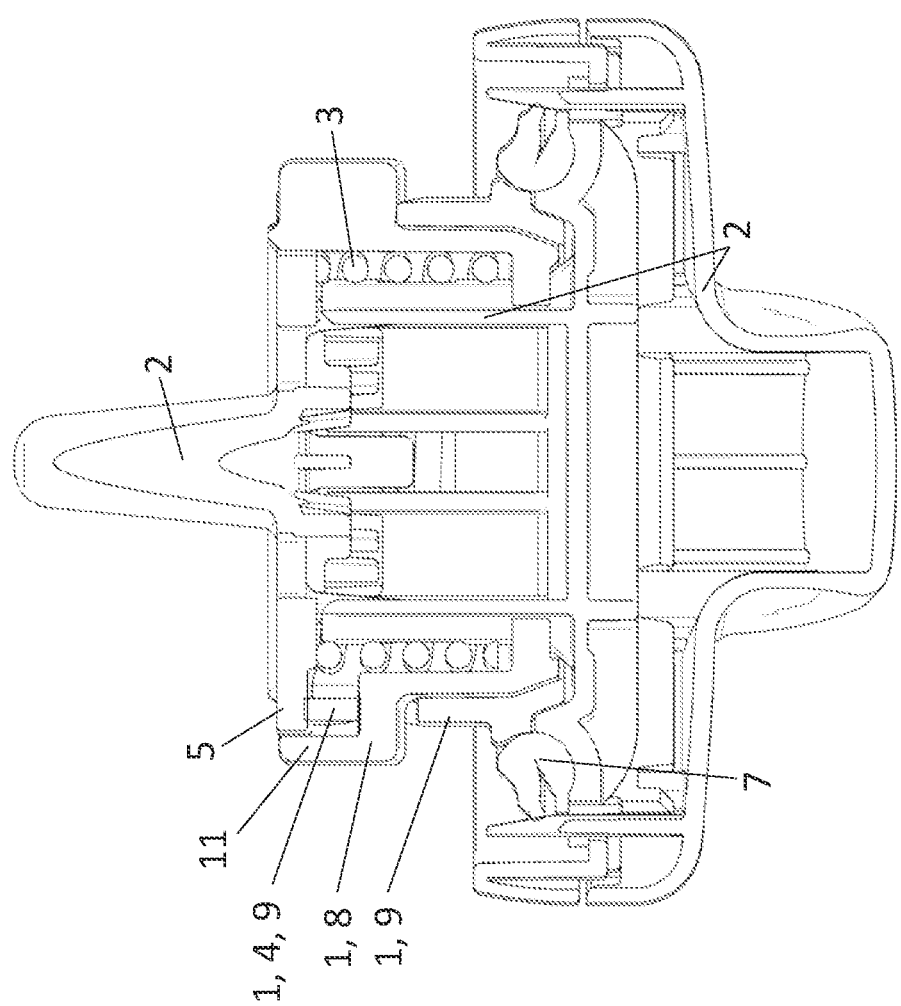
FIG. 4 illustrates a sectional view of the tank closure of FIG. 3 in the closed position.

In accordance with one or more embodiments, as illustrated in FIGS. 1 through 4, a tank closure is in a closed, locked state (FIGS. 1 and 3) and in an unclosed state, i.e., open state (FIGS. 2 and 4).

The tank closure comprises a first tank closure member 1 and a second tank closure member 2 that is axially movable relative to the first tank closure member 1. The first tank closure member 1 is configured to be positioned onto a tank filler neck, such that at least one component of the first tank closure member 1 (non-rotatable tank closure sub-component 9) is secured against rotation on the tank filler neck in order to close the tank filler neck via rotation movement of the second tank closure member 2.

At least in the closed position of the tank closure (FIGS. 2 and 4), the second tank closure member 2 is axially braced via a bias member such as a spring 3 against the first tank closure member 1 (FIG. 4).

The first tank closure member 1 comprises a rotatable tank closure component 8 which is rotatable with the second tank closure member 2 and a non-rotatable tank closure component 9 which is non-rotatable therewith during rotation of the second tank closure member 2.

The first tank closure member 1 has a first stop member 4, and the second tank closure member 2 has a second stop member 5 configured such that, in the closed position of the tank closure (FIGS. 2, 4), the second stop member 5 comes into abutment/contact against the first stop member 4 to prevent axial lift off of the second tank closure member 2 from the first tank closure member 1 against the spring force of the spring 3, even in the case of a significant overpressure in the interior of the tank (i.e., respectively from above in FIGS. 1 to 4).

In the closed position, an annular external seal 7 of the second tank closure member 2 is axially pressed by the spring 3 against the first tank closure member 1, and thus, against a tank filler neck on which the first tank closure member 1 is located (FIG. 4).

The second stop member 5 comprises at least one radially extending locking bar, preferably by at least two radially extending locking bars that are positioned to be offset to one another by 180 degrees, i.e. opposing one another. The first stop member 4 comprises at least one bearing surface for the locking bar, preferably by at least two bearing surfaces which are assigned in each case to a corresponding one of the locking bars, such that the bearing surfaces are also offset by 180 degrees to one another, i.e., are arranged so as to oppose one another.

The first stop members 4 are configured on the non-rotatable tank closure component 9.

Additionally, at least one ramp member 10 is configured on the non-rotatable tank closure component 9, the ramp member preferably only extending over a short portion of the periphery of the first tank closure member 1. In the closed position of the tank closure, an extension 11 of the rotatable tank closure component 8 is located at the end of the ramp member 10 in order to adopt therewith an end position 6.

Preferably, there is an equal number of first members 4 and second stop members 5, ramp members 10, and extensions 11.

The second tank closure member 2 may be brought into the closed position by rotation relative to the first tank closure member 1 as far as its end position 6. The second tank closure member 2 has an external shape, in particular, an external longitudinal rib, which facilitates a manual rotation of the second tank closure member 2. Before the end position 6 and thus outside the closed position of the tank closure, the second stop member 5 does not bear against the first stop member 4 and thus does not from a stop.

With the rotation of the second tank closure member 2, the rotatable tank closure component 8 is entrained via the locking bar of the second tank closure member 2 such that the rotatable tank closure component 8 is rotated with the second tank closure member 2.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 First tank closure member
2 Second tank closure member
3 Spring

4 First stop member
5 Second stop member
6 End position
7 Seal
8 Rotatable tank closure component
9 Non-rotatable tank closure component
10 Ramp member
11 Extension

What is claimed is:

1. A tank closure, comprising:
a first tank closure member having a first stop member;
a second tank closure member flexibly mounted in an axial direction relative to the first tank closure member, the second tank closure member having a second stop member; and
a bias member having a spring force to engage the second tank closure against the first tank closure member,
wherein the second stop member, in a closed position of the tank closure, forms a mechanical stop that comes into contact with the first stop member to prevent axial lift off of the second tank closure member from the first tank closure member against the spring force of the bias member.

2. The tank closure of claim 1, wherein the second tank closure member is rotatably moveable relative to the first tank closure member to the closed position as far as an end position.

3. The tank closure of claim 2, wherein the second stop member, before reaching the end position, does not form a stop relative to the first stop member.

4. The tank closure of claim 2, wherein the second stop member forms a stop relative to the first stop member upon reaching the end position.

5. The tank closure of claim 1, wherein the second tank closure member has a seal member configured such that, in the closed position of the tank closure, is axially pressed by the bias member in a direction towards the first tank closure member.

6. The tank closure of claim 1, wherein:
the second stop member comprises at least one locking bar, and
the first stop member comprises at least one bearing surface to be engaged by the locking bar.

7. The tank closure of claim 6, wherein the first tank closure member comprises a rotatable tank closure component which rotates concurrently with the second tank closure member.

8. The tank closure of claim 7, wherein the first tank closure member comprises a non-rotatable tank closure component which remains stationary during the rotation of the second tank closure member.

9. The tank closure of claim 8, wherein the non-rotatable tank closure component is configured to engage a tank filler neck to secure a position of the non-rotatable tank closure component in a peripheral direction.

10. The tank closure of claim 8, wherein the at least one bearing surface of the first stop member is arranged on the non-rotatable tank closure component.

11. The tank closure of claim 8, wherein the non-rotatable tank closure component comprises a ramp member.

12. The tank closure of claim 11, wherein an extension of the rotatable tank closure component is located at a distal end of the ramp member in order to adopt the end position.

13. The tank closure of claim 6, wherein the rotatable tank closure component is caused to move by the rotation of the second tank closure member via the locking bar of the second tank closure member in a manner that causes the rotatable tank closure component to rotate concurrently with the second tank closure member.

14. A tank closure, comprising:
a first tank closure member including a rotatable tank closure component, a non-rotatable tank closure component, and a first stop member having at least one bearing surface;
a second tank closure member mounted for rotation relative to the first tank closure member to a closed position, the second tank closure member having a second stop member configured to rotate concurrently with the rotatable tank closure component, and at least one locking bar configured to engage the at least one bearing surface, wherein the non-rotatable tank closure component is configured to remain stationary during the rotation of the second tank closure member; and
a bias member having a spring force to engage the second tank closure against the first tank closure member,
wherein the second stop member, in the closed position of the second tank closure member, forms a mechanical stop that comes into contact with the first stop member to prevent axial lift off of the second tank closure member from the first tank closure member against the spring force of the bias member.

15. The tank closure of claim 14, wherein the non-rotatable tank closure component is configured to engage a tank filler neck to secure a position of the non-rotatable tank closure component in a peripheral direction.

16. The tank closure of claim 14, wherein the at least one bearing surface of the first stop member is arranged on the non-rotatable tank closure component.

17. The tank closure of claim 15, wherein the non-rotatable tank closure component comprises a ramp member.

18. The tank closure of claim 15, wherein the rotatable tank closure component is caused to move by the rotation of the second tank closure member via the locking bar of the second tank closure member in a manner that causes the rotatable tank closure component to rotate concurrently with the second tank closure member.

19. A tank closure, comprising:
a first tank closure member having a pair of first stop members arranged offset so as to oppose one another;
a second tank closure member flexibly mounted in an axial direction relative to the first tank closure member, the second tank closure member having a pair of second stop members configured such that, in a closed position of the tank closure, form a mechanical stop that comes into contact with the first stop member which prevents axial lift off of the second tank closure member from the first tank closure member; and
a bias member having a spring force to engage the second tank closure against the first tank closure member,
wherein the pair of second stop members prevent the axial lift off of the second tank closure member from the first tank closure member against the spring force of the bias member.

* * * * *